United States Patent [19]

Daniels

[11] Patent Number: 5,305,013
[45] Date of Patent: Apr. 19, 1994

[54] DISK DRIVE STATUS GRAPHICAL DISPLAY

[75] Inventor: George R. Daniels, Houston, Tex.

[73] Assignee: Compaq Computer Corp., Houston, Tex.

[21] Appl. No.: 612,134

[22] Filed: Nov. 13, 1990

[51] Int. Cl.⁵ .............................................. G09G 3/32
[52] U.S. Cl. ...................................... 345/82; 345/904
[58] Field of Search ............... 340/700, 701, 762, 782, 340/815.01, 815.03, 815.1, 815.15; 362/800

[56] References Cited

U.S. PATENT DOCUMENTS

| | | | |
|---|---|---|---|
| 4,509,046 | 4/1985 | Yamada | 340/815.1 |
| 4,586,034 | 4/1986 | Nakamine | 340/815.1 |
| 4,727,353 | 2/1988 | Rahter | 340/815.15 |
| 4,837,565 | 6/1989 | White | 340/815.03 |

FOREIGN PATENT DOCUMENTS 0019938 2/1983 Japan ..................... 340/700
8802525 4/1988 World Int. Prop. O. ...... 340/815.03

OTHER PUBLICATIONS

Fujitsu America, "5-25" Mounting Frame Kit" manual; 1987; pp. 1-10.

Primary Examiner—Richard Hjerpe
Assistant Examiner—M. Fatahiyar
Attorney, Agent, or Firm—Pravel, Hewitt, Kimball & Krieger

[57] ABSTRACT

A graphical display icon on the front of a data storage unit provides status information on disk drives within the unit. The icon has a shape identical to that of the unit and includes a number of bicolor LED's which each correspond to a similarly situated disk drive located in the unit. The color emitted by the LED's communicate information on the status of the corresponding disk drive within the unit.

6 Claims, 3 Drawing Sheets

5,305,013

DISK DRIVE STATUS GRAPHICAL DISPLAY

BACKGROUND OF THE INVENTION

1. Field of the Invention

The present invention relates to the use of disk drives in computer systems, and more particularly to a graphical display icon which is used to communicate information on the location and activity or error status of disk drives in the system.

2. Description of the Related Art

Computer systems are becoming increasingly large and complex and hence require increasing amounts of data storage capability. Computer systems are also being called upon to perform increasingly difficult tasks which require large amounts of data storage. This is particularly true of computer systems that serve as file servers in local area networks (LAN's). Additionally, computer systems are being called upon to perform critical tasks which require a high degree of data integrity and reliability. Therefore, a major area of growth in the computer industry has been to provide larger and more reliability data storage capabilities for computer systems.

Computer systems that require large amounts of data storage may include several drive bays or drive chambers comprising a plurality of disk drives. A common problem that may occur among disk drives is overheating of a drive, which may cause failure of the drive and loss of data. In addition, many different types of error conditions generally occur which may cause a particular disk drive to fail. In current computer systems, an operator generally must read a diagnostic file prepared by the operating system to determine if a particular logical volume has failed or has encountered an error condition. The operator must then correlate the logical volume with the physical disk drive and then determine the physical location of the drive to effect problem resolution. This multiple correlation is difficult and time consuming and can be almost impossible if the proper records cannot be found. Therefore, it is desirable to have an apparatus which informs an operator of the status of each of the disk drives in the system so that the operator is immediately notified of a failed disk drive or a disk drive which has encountered an error condition.

SUMMARY OF THE INVENTION

The present invention comprises a graphical display or icon situated on the front of a computer system or data storage unit having a plurality of disk drives. The shape of the icon resembles an outline of the unit and includes bicolor light emitting diodes (LED's) at locations corresponding to disk drive locations inside the unit. Each of the LED's have a one-to-one correspondence with the respective disk drive situated in the corresponding location inside the unit, and the bicolor LED's emit certain colors which reflect the current status of their corresponding disk drives.

In the preferred embodiment, each of the LED's emits a green color when its corresponding disk drive is active. Each of the bicolor LED's emits an amber color when its corresponding disk drive has failed, is shut down, or has encountered an error condition. All of the LED's emit a flashing amber color when any of the respective disk drives are overheating. Therefore, by viewing the LED's located on the front of the unit, an operator can determine the activity or error status of the disk drives within the unit and immediately and without further references correlate the error condition to a physical location in the drive area.

BRIEF DESCRIPTION OF THE DRAWINGS

A better understanding of the present invention can be obtained when the following detailed description of the preferred embodiment is considered in conjunction with the following diagrams, in which.

DETAILED DESCRIPTION OF THE PREFERRED EMBODIMENT

Figure 1:
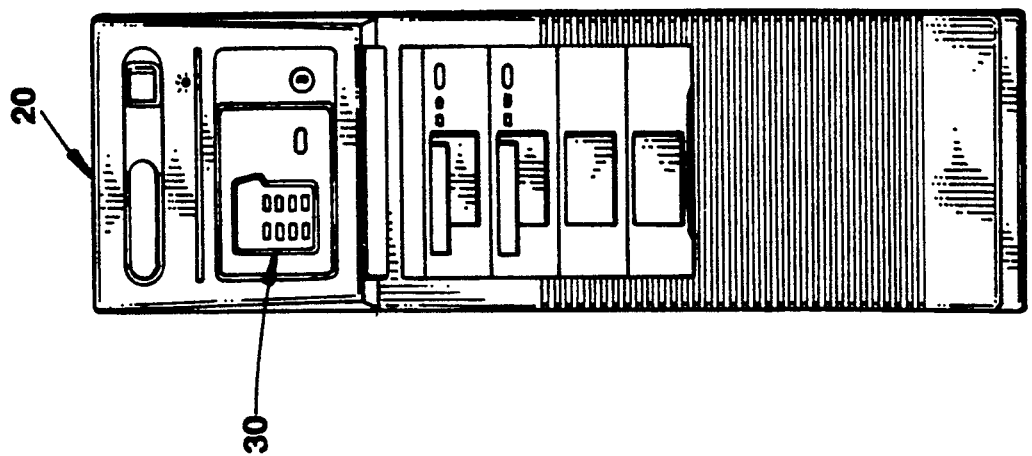
FIG. 1 illustrates a data storage unit including a graphical display icon according to the present invention.

Referring now to FIG. 1, a data storage unit 20 is shown. The data storage unit 20 preferably includes two disk drive chambers, wherein each of the disk drive chambers can preferably hold up to four disk drives. The front of the data storage unit 20 includes an icon 30 according to the present invention which is preferably shaped like a side view of the data storage unit 20. The icon 30 includes eight bicolor light emitting diodes (LED's) according to the preferred embodiment. Each of the bicolor LED's corresponds to a disk drive location in the data storage unit 20.

Figure 2:
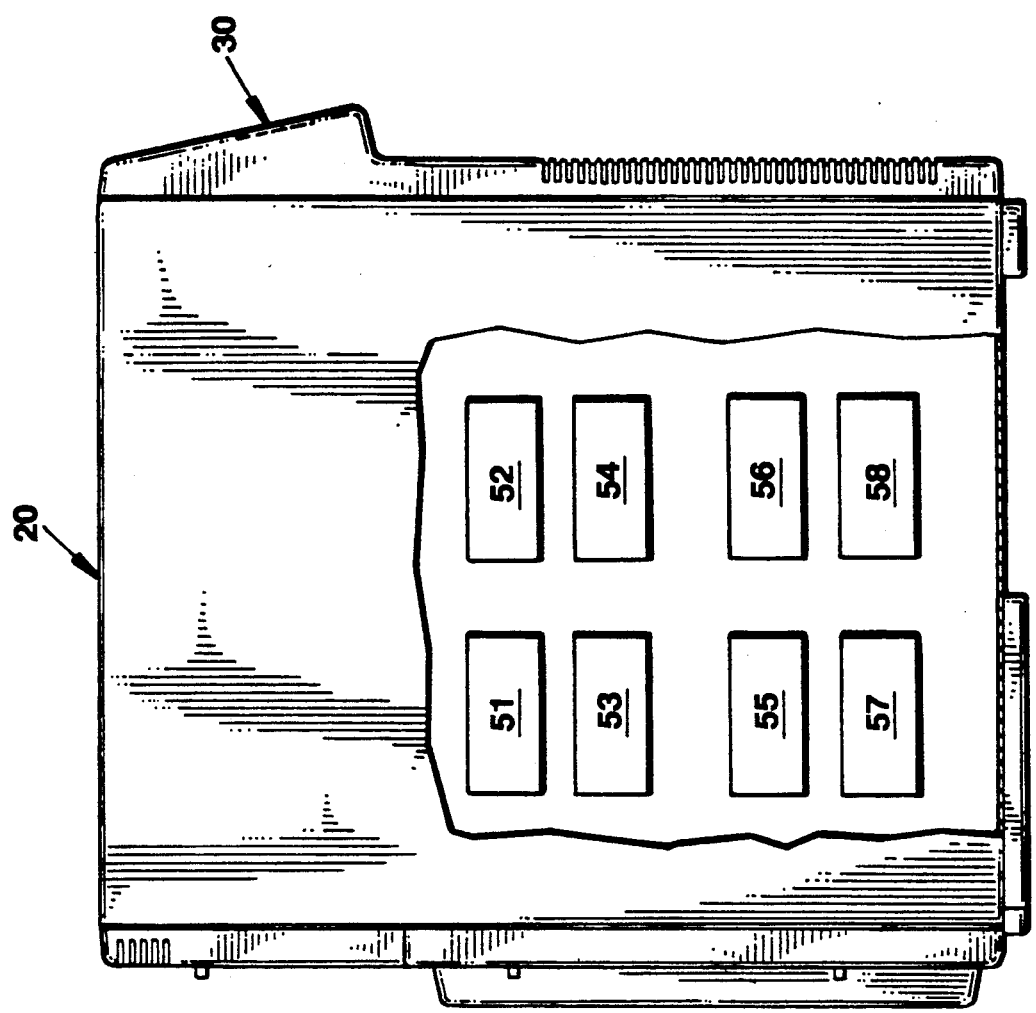
FIG. 2 is a view in partial cross-section of the data storage unit of FIG. 1 including disk drives according to the present invention.

Referring now to FIG. 2, a side, partial cross-sectional view of the data storage unit 20 is shown. The data storage unit 20 includes eight disk drives 51, 52, 53, 54, 55, 56, 57 and 58 which are physically situated in two columns of four rows as shown.

Figure 3:
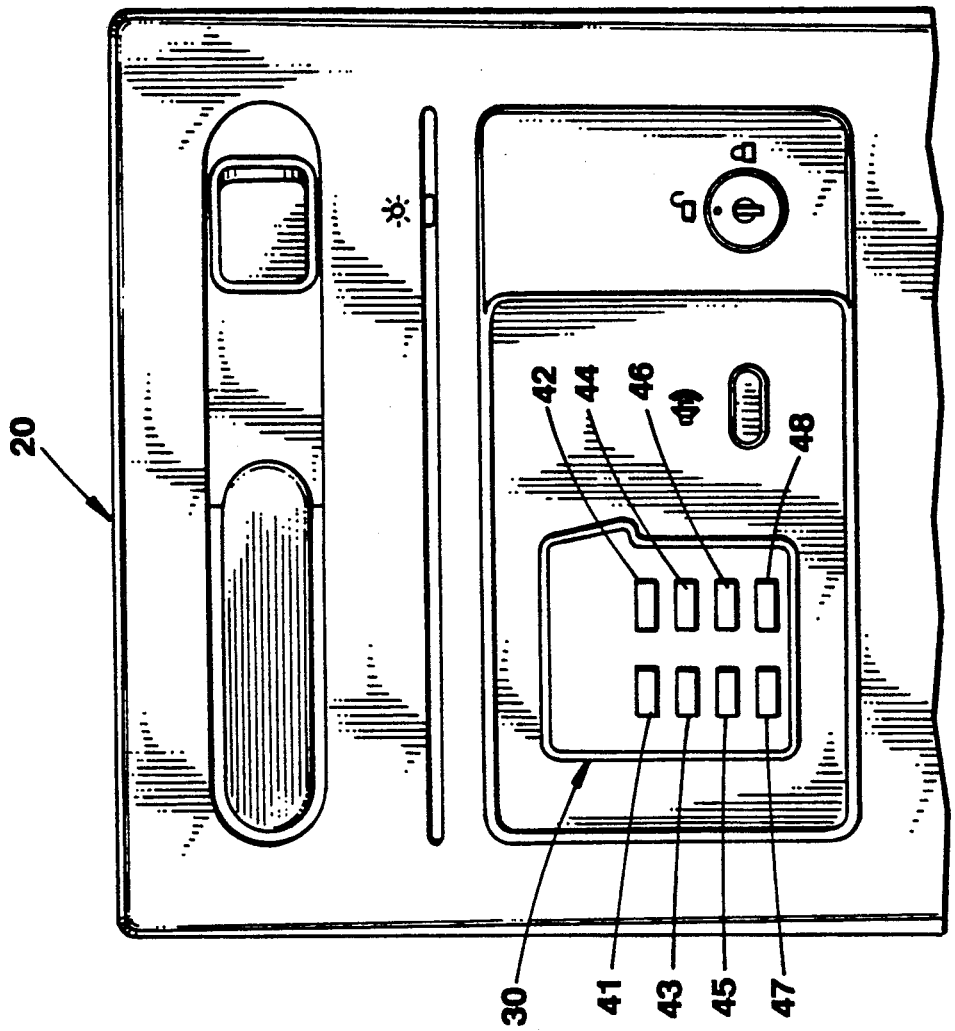
FIG. 3 is an enlarged view of the graphical display icon of FIG. 1 according to the present invention.

Referring now to FIG. 3, a close up view of the icon 30 of the present invention is shown. The icon 30 includes LED's 41, 42, 43, 44, 45, 46, 47 and 48 which are arranged in an identical manner to the disk drives 51, 52, 53, 54, 55, 56, 57, and 58. Each of the respective LED's 41, 42, 43, 44, 45, 46, 47, and 48 has a one-to-one correspondence with the similarly situated disk drive 51, 52, 53, 54, 55, 56, 57, and 58 in the data storage unit 20. Therefore, the LED 41 corresponds to the disk drive 51, the LED 42 corresponds to the disk drive 52, and so on. The bicolor LED's 41 through 48 generate colors which represent the status of the corresponding disk drives 51 through 58. The bicolor LED's 41 through 48 may generate two colors according to the preferred embodiment. However, the use of other types of LED's which generate a different number of colors is also contemplated. In the preferred embodiment, each of the bicolor LED's 41 through 48 generates a green light when its corresponding disk drive 51 through 58 is active, each of the LED's 41 through 48 generates an amber color when its corresponding disk drive 51 through 58 has encountered an error condition or is shut down, and all of the LED's 41 through 48 generate a flashing amber light when one or more of the respective disk drives 51 through 58 is overheating.

Figure 4:
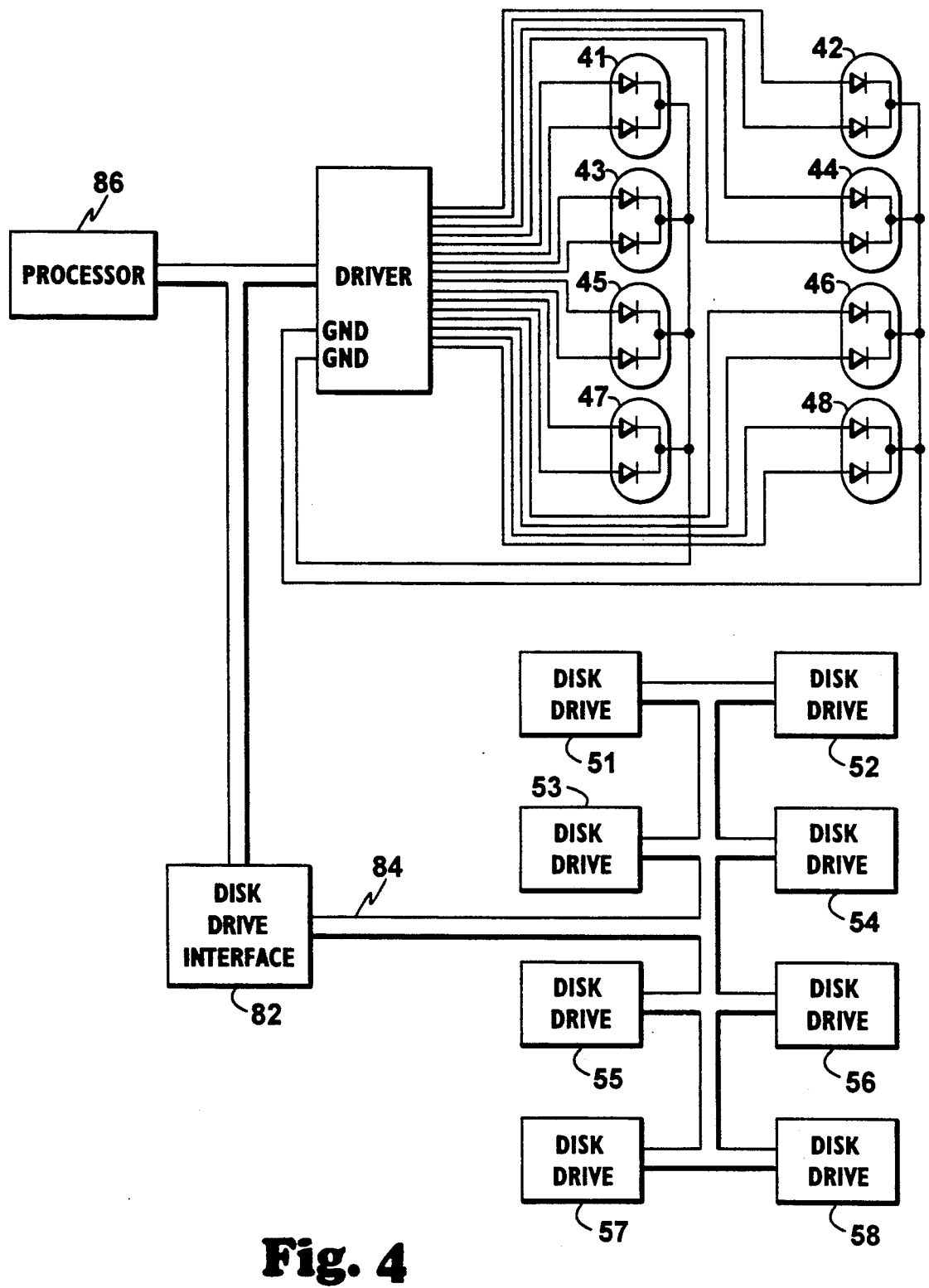
FIG. 4 is a block diagram of logic which controls the LED's in the graphical display icon of FIGS. 1 and 3.

Referring now to FIG. 4, a schematic block diagram of logic circuitry which controls the LED's 41 through 48 in the icon 30 is generally shown. Each of the disk drives 51 through 58 are coupled together and to a disk drive interface 82 through a bus 84, which is preferably based on the small computer system interface (SCSI) standard. The disk drive interface is coupled to a processor 86 which may be located in the data storage unit 20, but is preferably located in a system remote from the unit 20 in the present embodiment.

The processor 86 receives information regarding the status of each of the disk drives 51 through 58 from the disk drive interface 82. The processor 86 writes information through a driver 88 to the LED's 41 through 48 to set the output of each of the LED's 41 through 48 depending on the status of their corresponding disk drives 51 through 58. The bicolor LED's 41 through 48 are preferably three terminal devices according to the preferred embodiment. The two inputs of each of the LED's 41 through 48 receive signals from the processor 86 through the driver 88. The third terminal of each of the LED's 41 through 48 is connected to ground on the driver 88. Each of the bicolor LED's 41 through 48 includes two actual LED's, one of which emits a green color, and one of which emits an amber color. Therefore, the processor 86 generates the appropriate signals to the input terminals of each of the bicolor LED's 41 through 48 to produce either a green or amber output from the respective LED's 41 through 48. The processor 86 continuously turns on and then turns off the respective amber LED to produce a flashing amber output.

Therefore, the present invention discloses an icon situated on the front of a data storage unit whose shape resembles that of the data storage unit. The icon includes an number of LED's which correspond to similarly situated disk drives in the data storage unit. The output of the respective LED's represent the status of their corresponding disk drives. The graphical display produced by the LED's provides readily convenient information on disk drive status to an operator and obviates the necessity of reading diagnostic files, then correlating the logical volume to a physical drive and then correlating the physical disk drive to an actual location to determine which drive is of interest. The operator simply looks at the icon for an active or error indication and the indicated drive is in that same relative position in the unit.

The foregoing disclosure and description of the invention are illustrative and explanatory thereof, and various changed in the size, shape, materials, components, and circuit elements, as well as in the details of the illustrated circuitry and construction may be made without departing from the spirit of the invention.

I claim:

1. A graphical display for communicating disk drive status located on a unit having a first number of disk drive locations physically arranged in a first type format, wherein each of the disk drive locations may include a disk drive having a drive status, the graphical display comprising:
   a first number of light emitting diodes, each of said light emitting diodes having a one-to-one correspondence with a disk drive location; and
   means surrounding said light emitting diodes having substantially the same outline as a view of the unit, wherein said light emitting diodes are arranged within said surrounding means and with respect to each other light emitting diode so that said light emitting diodes are in the same arrangement as the disk drive locations to which they correspond.

2. The graphical display of claim 1, wherein the drive status includes an active status and an error status; wherein each of said light emitting diodes emits a first color when the disk drive in the corresponding drive location has the active status; and
   wherein each of said light emitting diodes emits a second color when the disk drive in the corresponding drive location has the error status.

3. The graphical display of claim 1, wherein said surrounding means corresponds to the side view of the unit.

4. A graphical display for communicating device status located on a unit having a first number of device locations physically arranged in a first type format, wherein each of the device locations may include a device having a device status, the graphical display comprising:
   a first number of light emitting diodes, each of said light emitting diodes having a one-to-one correspondence with a device location; and
   means surrounding said light emitting diodes having substantially the same outline as a view of the unit, wherein said light emitting diodes are arranged within said surrounding means and with respect to each other light emitting diode so that said light emitting diodes are in the same arrangement as the device locations to which they correspond.

5. The graphical display of claim 4, wherein the device status includes an active status and an error status; wherein each of said light emitting diodes emits a first color when the device in the corresponding drive location has the active status; and
   wherein each of said light emitting diodes emits a second color when the device in the corresponding device location has the error status.

6. The graphical display of claim 4, wherein said surrounding means corresponds to the side view of the unit.

* * * * *